US010910666B2

(12) United States Patent
Ose et al.

(10) Patent No.: US 10,910,666 B2
(45) Date of Patent: *Feb. 2, 2021

(54) METHOD FOR PRODUCING ALL-SOLID-STATE LITHIUM ION SECONDARY BATTERY

(71) Applicant: TOYOTA JIDOSHA KABUSHIKI KAISHA, Toyota (JP)

(72) Inventors: Norihiro Ose, Sunto-gun (JP); Hajime Hasegawa, Susono (JP); Mitsutoshi Otaki, Susono (JP); Yusuke Kintsu, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 143 days.

This patent is subject to a terminal disclaimer.

(21) Appl. No.: 15/950,665

(22) Filed: Apr. 11, 2018

(65) Prior Publication Data

US 2018/0301747 A1 Oct. 18, 2018

(30) Foreign Application Priority Data

Apr. 18, 2017 (JP) ................................ 2017-082217

(51) Int. Cl.
*H01M 10/0525* (2010.01)
*H01M 4/38* (2006.01)
(Continued)

(52) U.S. Cl.
CPC ..... *H01M 10/0525* (2013.01); *H01M 4/0438* (2013.01); *H01M 4/382* (2013.01);
(Continued)

(58) Field of Classification Search
None
See application file for complete search history.

(56) References Cited

U.S. PATENT DOCUMENTS

2016/0315311 A1 10/2016 Jeon et al.
2017/0077732 A1 3/2017 Otaki et al.

FOREIGN PATENT DOCUMENTS

JP 2000-173594 A 6/2000
JP 2009176541 A * 8/2009
(Continued)

OTHER PUBLICATIONS

Non-Final Office Action dated Jul. 30, 2019 from the United States Patent and Trademark Office in U.S. Appl. No. 15/920,489.
(Continued)

*Primary Examiner* — Tracy M Dove
(74) *Attorney, Agent, or Firm* — Sughrue Mion, PLLC

(57) ABSTRACT

Disclosed is a method for producing an all-solid-state lithium ion secondary battery being excellent in cycle characteristics. The production method may be a method for producing an all-solid-state lithium ion secondary battery, wherein the method comprises an anode mixture forming step of obtaining an anode mixture by drying a raw material for an anode mixture, which contains an anode active material, a solid electrolyte and an electroconductive material; and wherein, for the anode mixture after being dried in the anode mixture forming step, a voidage V of the inside of the anode mixture calculated by the following formula (1) is 43% or more and 54% or less:

$$V=100-(D_1/D_0)\times 100 \quad \text{Formula (1).}$$

4 Claims, 1 Drawing Sheet

(51) Int. Cl.

| | |
|---|---|
| ***H01M 10/0562*** | (2010.01) |
| ***H01M 4/62*** | (2006.01) |
| ***H01M 4/04*** | (2006.01) |
| ***H01M 4/48*** | (2010.01) |
| ***H01M 10/44*** | (2006.01) |
| *H01M 4/02* | (2006.01) |

(52) U.S. Cl.
CPC ........... *H01M 4/386* (2013.01); *H01M 4/483* (2013.01); *H01M 4/625* (2013.01); *H01M 10/0562* (2013.01); *H01M 10/446* (2013.01); *H01M 2004/027* (2013.01)

(56) References Cited

FOREIGN PATENT DOCUMENTS

| | | | |
|---|---|---|---|
| JP | 2012-129150 | A | 7/2012 |
| JP | 2013-069416 | A | 4/2013 |
| JP | 2016201310 | A | 12/2016 |
| JP | 2017-059534 | A | 3/2017 |

OTHER PUBLICATIONS

Final Office Action dated Dec. 5, 2019 from the United States Patent and Trademark Office in U.S. Appl. No. 15/920,489.
Communication dated Mar. 23, 2020, issued by the U.S. Patent and Trademark Office in U.S. Appl. No. 15/950,489.
Office Action dated Jul. 17, 2020, issued by the U.S. Patent and Trademark Office in U.S. Appl. No. 15/950,489.
Non-Final Office Action dated Oct. 26, 2020 from the United States Patent and Trademark Office in U.S. Appl. No. 15/950,489.

* cited by examiner

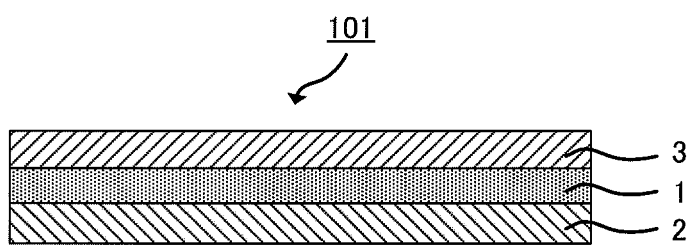
101
3
1
2

METHOD FOR PRODUCING ALL-SOLID-STATE LITHIUM ION SECONDARY BATTERY

TECHNICAL FIELD

The disclosure relates to a method for producing an all-solid-state lithium ion secondary battery.

BACKGROUND

An active material (an alloy-based active material) containing a metal such as Si, the metal being able to form an alloy with Li, has a large theoretical capacity per volume compared to carbon-based anode active materials. Therefore, a lithium ion battery using such an alloy-based active material in its anode, has been proposed.

Patent Literature 1 discloses a negative electrode mixture for a secondary battery, the mixture comprising, as a negative electrode active material powder, an alloy-based active material having an average particle diameter of 10 μm or less. Patent Literature 1 also discloses an all-solid lithium ion battery comprising an anode layer that contains the negative electrode active material powder.

Patent Literature 1: Japanese Patent Application Laid-Open No. 2013-69416

However, the all-solid-state lithium ion secondary battery as disclosed in Patent Literature 1 which uses an alloy-based active material as an anode active material, shows a low capacity retention rate when it repeats charge-discharge cycles.

SUMMARY

In light of this circumstance, an object of the disclosed embodiments is to provide a method for producing an all-solid-state lithium ion secondary battery including an anode that comprises, as an anode active material, at least one selected from the group consisting of a metal that is able to form an alloy with Li, an oxide of the metal, and an alloy of the metal and Li, and being excellent in cycle characteristics.

In a first embodiment, there is provided a method for producing an all-solid-state lithium ion secondary battery comprising a cathode, an anode and a solid electrolyte layer disposed therebetween, wherein the method comprises: an anode mixture forming step of obtaining an anode mixture by drying a raw material for an anode mixture, which contains an anode active material, a solid electrolyte and an electroconductive material, and an electricity passing step of passing electricity through a laminate comprising a cathode mixture, the anode mixture and a solid electrolyte material part disposed between the electrode mixtures to change the cathode mixture, the anode mixture and the solid electrolyte material part into a cathode, an anode and a solid electrolyte layer, respectively; wherein the anode active material comprises at least one active material selected from the group consisting of a metal that is able to form an alloy with Li and an oxide of the metal; and wherein, for the anode mixture after being dried in the anode mixture forming step, a voidage V of the inside of the anode mixture calculated by the following formula (1) is 43% or more and 54% or less:

$$V=100-(D_1/D_0)\times 100 \quad \text{Formula (1)}$$

(where V is the voidage (%) of the inside of the dried anode mixture; $D_1$ is an absolute density (g/cm$^3$) of the anode mixture; and $D_0$ is a true density (g/cm$^3$) of the anode mixture.)

A volume percentage of the electroconductive material may be 1 volume % or more when a volume of the anode mixture after being dried in the anode mixture forming step is determined as 100 volume %.

The anode active material may comprise elemental silicon.

The solid electrolyte may be a sulfide-based solid electrolyte.

The electroconductive material may be at least one carbonaceous material selected from the group consisting of carbon black, carbon nanotube and carbon nanofiber.

According to the production method of the disclosed embodiments, by using such an anode mixture that the voidage V of the anode mixture after being dried in the anode mixture forming step is in a specific range, an all-solid-state lithium ion secondary battery being excellent in cycle characteristics compared to the case of using an anode mixture out of the range, can be provided.

BRIEF DESCRIPTION OF THE DRAWING

FIG. 1 is a schematic view of an example of the structure of an all-solid-state lithium ion secondary battery.

DETAILED DESCRIPTION

The production method according to the disclosed embodiments is a method for producing an all-solid-state lithium ion secondary battery comprising a cathode, an anode and a solid electrolyte layer disposed therebetween, wherein the method comprises: an anode mixture forming step of obtaining an anode mixture by drying a raw material for an anode mixture, which contains an anode active material, a solid electrolyte and an electroconductive material, and an electricity passing step of passing electricity through a laminate comprising a cathode mixture, the anode mixture and a solid electrolyte material part disposed between the electrode mixtures to change the cathode mixture, the anode mixture and the solid electrolyte material part into a cathode, an anode and a solid electrolyte layer, respectively; wherein the anode active material comprises at least one active material selected from the group consisting of a metal that is able to form an alloy with Li and an oxide of the metal; and wherein, for the anode mixture after being dried in the anode mixture forming step, a voidage V of the inside of the anode mixture calculated by the following formula (1) is 43% or more and 54% or less:

$$V=100-(D_1/D_0)\times 100 \quad \text{Formula (1)}$$

(where V is the voidage (%) of the inside of the dried anode mixture; $D_1$ is an absolute density (g/cm$^3$) of the anode mixture; and $D_0$ is a true density (g/cm$^3$) of the anode mixture.)

The metal that is able to form an alloy with Li is low in ion conductivity and electron conductivity. Therefore, when the metal is used as an anode active material, generally, an electroconductive material and a solid electrolyte are incorporated in the anode, in combination with the anode active material.

When the metal that is able to form an alloy with Li (hereinafter, the metal that is able to form an alloy with Li may be referred to as M) is used as the anode active material, along with the charging of the lithium ion secondary battery, the reaction represented by the following formula (2), that is, a so-called electrochemical alloying reaction, is initiated in the anode:

$$x\mathrm{Li}^+ + xe^- + y\mathrm{M} \rightarrow \mathrm{Li}_x\mathrm{M}_y \quad \text{Formula (2)}$$

Along with the discharging of the lithium ion secondary battery, as represented by the following formula (3), an extraction reaction of Li ions from the alloy of Si and Li, is initiated in the anode:

$$Li_xM_y \rightarrow xLi^+ + xe^- + yM \quad \text{Formula (3)}$$

The lithium ion secondary battery using the metal that is able to form an alloy with Li as the anode active material, undergoes a large volume change in association with the Li insertion/extraction reactions represented by the formulae (2) and (3).

Patent Literature 1 describes that the average particle diameter of a powder of an ion conductive material (solid electrolyte) may be small because, as the average particle diameter decreases, contact points between the anode active material and the solid electrolyte increase.

However, it was found that when there are many spaces in the anode of the all-solid-state lithium ion secondary battery, aggregation of the electroconductive material is likely to occur in the anode; therefore, in the case of using an alloy-based anode active material such as Si, an electron conducting path in the anode is blocked and, as a result, the capacity retention rate of the battery may deteriorate especially at the initial stage.

In the secondary battery production step, just after the formation of the anode mixture, the electroconductive material is dispersed in the anode mixture. When the density of the dried anode is high, dense electrical connection is fixed between particles of the electroconductive material; therefore, the electron conducting path is maintained even in the anode obtained through pressing, etc. On the other hand, when the density of the inside of the dried anode mixture is low, even if the electroconductive material maintains its electrical connection, the electroconductive material may move due to the presence of many spaces. As a result, the electroconductive material is unevenly distributed after the pressing, etc., and narrows the electron conducting path in the area where the amount of the electroconductive material is small.

As just described, in the area where the electron conducting path is narrow, the electron conducting path is gradually cut by repeating a volume change of the alloy-based active material in association with charging and discharging. As a result, it is considered that the capacity retention rate of the lithium ion secondary battery deteriorates.

In the production method of the disclosed embodiments, by using such an anode mixture that after being dried in the anode mixture forming step, the voidage V of the inside of the anode mixture is 43% or more and 54% or less, uneven distribution of the electroconductive material can be prevented, while maintaining excellent ion conductivity. Therefore, it is considered that the capacity retention rate can be kept high even when the alloy-based active material is used as the anode active material.

The production method of the disclosed embodiments will be described in detail.

The disclosed embodiments comprise (1) the anode mixture forming step and (2) the electricity passing step. The disclosed embodiments are not limited to the two steps and may include other steps relating to the production of the cathode or solid electrolyte layer.

Hereinafter, the steps (1) and (2) and other steps will be described in detail.

(1) Anode Mixture Forming Step

The raw material for the anode mixture used in this step comprises an anode active material, an electroconductive material and a solid electrolyte.

(Anode Active Material)

The anode active material comprises at least one active material selected from the group consisting of a metal that is able to form an alloy with Li and an oxide of the metal.

The metal that is able to form an alloy with Li is not particularly limited, as long as it is a metal that can insert/extract Li ions along with the so-called electrochemical alloying reactions represented by the formulae (2) and (3). As the metal element that is able to form an alloy with Li, examples include, but are not limited to, Mg, Ca, Al, Si, Ge, Sn, Pb, Sb and Bi. Of them, the metal that is able to form an alloy with Li may be Si, Ge or Sn, and it may be Si. In the disclosed embodiments, the term "metal" is used as a concept including the following terms that are used for general classification of elements: "metal" and "semimetal".

The anode active material may comprise elemental silicon.

The oxide of the metal that is able to form an alloy with Li, means such an oxide that along with the charging of the lithium ion secondary battery, M is produced in the anode by the electrochemical reaction represented by the following formula (4):

$$xLi^+ + xe^- + yMO \rightarrow Li_xO_y + yM \quad \text{Formula (4)}$$

By the electrochemical reaction represented by the formula (2) or (3), Li can be inserted in and extracted from the M produced from the oxide of the metal that is able to form an alloy with Li by the formula (4). Therefore, generally, the oxide of the metal that is able to form an alloy with Li is classified into the category of alloy-based active materials. As with the metal that is able to form an alloy with Li, the oxide of the metal that is able to form an alloy with Li, has such a property that it undergoes a large volume change in association with the Li insertion/extraction reactions.

As the oxide of the metal that is able to form an alloy with Li, examples include, but are not limited to, SiO and SnO. The oxide may be SiO.

The percentage of the anode active material in the anode mixture is not particularly limited. For example, it may be 40 mass % or more, may be in a range of from 50 mass % to 90 mass %, or may be in a range of from 50 mass % to 70 mass %.

The form of the metal that is able to form an alloy with Li and the oxide of the metal, is not particularly limited. As the form, examples include, but are not limited to, a particle form and a film form.

(Solid Electrolyte)

The raw material for the solid electrolyte is not particularly limited, as long as it is a raw material that is applicable to the all-solid-state lithium ion secondary battery. As the raw material, for example, an oxide-based solid electrolyte, a sulfide-based solid electrolyte, a crystalline oxide and a crystalline nitride, all of which have high Li ion conductivity, may be used. Of them, the sulfide-based solid electrolyte may be used.

As the oxide-based non-crystalline solid electrolyte, examples include, but are not limited to, $Li_2O—B_2O_3—P_2O_3$ and $Li_2O—SiO_2$. As the sulfide-based non-crystalline solid electrolyte, examples include, but are not limited to, $Li_2S—SiS_2$, $LiI—Li_2S—SiS_2$, $LiI—Li_2S—P_2S_5$, $LiI—Li_3PO_4—P_2S_5$ and $Li_2S—P_2S_5$. As the crystalline oxide and the crystalline nitride, examples include, but are not limited to, LiI, $Li_3N$, $Li_5La_3Ta_2O_{12}$, $Li_7La_3Zr_2O_{12}$, $Li_6BaLa_3Ta_2O_{12}$, $Li_3PO_{(4-3/2w)}N_{w(w<1)}$, and $Li_{3.6}Si_{0.6}P_{0.4}O_4$.

The percentage of the solid electrolyte in the anode mixture is not particularly limited. For example, it may be 10 mass % or more, may be in a range of from 20 mass % to 50 mass %, or may be in a range of from 25 mass % to 45 mass %.

An example of the method for preparing the solid electrolyte will be described below.

First, a raw material for the solid electrolyte, a dispersion medium, and dispersing balls are put in a container. Mechanical milling is carried out using the container, thereby pulverizing the solid electrolyte. A mixture thus obtained is appropriately heated, thereby obtaining the solid electrolyte.

(Electroconductive Material)

The electroconductive material is not particularly limited, as long as it is an electroconductive material that is, in the anode, applicable to the all-solid-state lithium ion secondary battery. As the raw material for the electroconductive material, examples include, but are not limited to, at least one carbonaceous material selected from the group consisting of carbon black (e.g., acetylene black and furnace black), carbon nanotube and carbon nanofiber.

From the viewpoint of electron conductivity, the raw material may be at least one carbonaceous material selected from the group consisting of carbon nanotube and carbon nanofiber. The carbon nanotube and carbon nanofiber may be vapor-grown carbon fiber (VGCF).

When the volume of the anode mixture after being dried in the anode mixture forming step is determined as 100 volume %, the volume percentage of the electroconductive material may be 1 volume % or more. As just described, by using the electroconductive material of 1 volume % or more, many electron conducting paths can be ensured in the anode to be obtained.

In the disclosed embodiments, the volume percentage of each material in the anode mixture is a value calculated from the true density of the material. In the calculation of the volume percentage, spaces in the anode mixture are not taken into account.

In addition to the above-mentioned components, the anode mixture may contain other components such as a binder. As the binder, examples include, but are not limited to, polyvinylidene fluoride (PVdF), polytetrafluoroethylene (PTFE), butylene rubber (BR), styrene-butadiene rubber (SBR), polyvinyl butyral (PVB) and acrylic resin. The binder may be polyvinylidene fluoride (PVdF).

When the volume percentage of the anode mixture is determined as 100 volume %, the volume ratio of the binder may be 0.3 volume % or more and 9.0 volume % or less, or it may be 1.0 volume % or more and 4.0 volume % or less.

Since a high energy density is obtained, the anode of the disclosed embodiments may be an anode in which the volume percentage of components other than the anode active material, is small.

The raw material for the anode mixture may contain components other than the anode active material, the electroconductive material, the solid electrolyte and the binder, which is incorporated as needed. In addition, the raw material for the anode mixture may contain components that are removed in the process of forming the anode mixture. As the components that are contained in the raw material for the anode mixture and removed in the process of forming the anode mixture, examples include, but are not limited to, a solvent and a removable binder. As the removable binder, such a binder can be used, that functions as the binder in the formation of the anode mixture and is decomposed or volatilized and removed by sintering in the step of obtaining the anode mixture, thereby providing a binder-free anode mixture.

The method for preparing the raw material for an anode mixture is not particularly limited. For example, the raw material for an anode mixture is obtained by stirring a mixture of the anode active material, the electroconductive material, the solid electrolyte and the dispersion medium using an ultrasonic disperser or a shaker.

The method for forming the anode mixture is not particularly limited. As the method for forming the anode mixture, examples include, but are not limited to, a method for compression-forming a powder of the raw material for the anode mixture. In the case of compression-forming the powder of the raw material for the anode mixture, generally, a press pressure of from about 400 to about 1,000 MPa is applied. The compression-forming may be carried out by using a roll press. In this case, a line pressure may be set to 10 to 100 kN/cm.

Also, the following methods can be adopted: a method in which a powder of the raw material for the anode mixture containing the removable binder, is subjected to compression forming and then sintered to remove the binder, and a method in which a dispersion of the raw material for the anode mixture containing the solvent and the removable binder, is applied on the solid electrolyte material part or on a different support, dried, formed into the anode mixture and then sintered to remove the binder.

The method for drying the thus-formed anode mixture is not particularly limited. As the method, examples include, but are not limited to, a heating method with a sufficiently heated heat source such as a hot plate.

In the disclosed embodiments, for the anode mixture after being dried in the anode mixture forming step, the voidage V of the inside of the anode mixture is 43% or more and 54% or less; therefore, the electroconductive material can be kept in an evenly dispersed state in the anode produced from the anode mixture.

The voidage V is calculated by the following formula (1):

$$V=100-(D_1/D_0)\times 100 \qquad \text{Formula (1)}$$

(where V is the voidage (%) of the inside of the dried anode mixture; $D_1$ is an absolute density (g/cm$^3$) of the anode mixture; and $D_0$ is a true density (g/cm$^3$) of the anode mixture.)

The absolute density of the anode mixture is a value obtained by dividing the mass of the anode mixture by its volume. Meanwhile, the true density of the anode mixture is a value obtained as follows: for each substance contained in the anode mixture, a product of its true density and content percentage is obtained; products obtained for all substances in the anode mixture are summed to obtain the true density of the anode mixture.

When the voidage V is more than 54%, the electroconductive material may move in the dried anode mixture. Therefore, the electroconductive material is unevenly distributed in the subsequent pressing and, as a result, narrows the electron conducting path in the area where the amount of the electroconductive material is small, which leads to a decrease in capacity retention rate.

On the other hand, when the voidage V is less than 43%, the density of the anode mixture is too high and makes the battery formation difficult in the pressing. Also in this case, the electroconductive material already starts to aggregate at the time of drying; therefore, the electroconductive material is unevenly distributed in the subsequent pressing. As a result, in the area where the amount of the electroconductive material is small, the electron conducting path narrows and leads to a decrease in capacity retention rate.

To maintain the ion conducting path and the electron conducting path with balance, the voidage V may be 44% or more and 53% or less, or it may be 45% or more and 52% or less.

(2) Electricity Passing Step

The electricity passing step is no particularly limited, as long as it is a step of passing electricity through a laminate comprising the cathode mixture, the anode mixture, and the solid electrolyte material part disposed between the electrode mixtures (hereinafter, such a laminate may be referred to as battery member). By passing electricity, the cathode mixture, the anode mixture and the solid electrolyte material part are changed into a cathode, an anode and a solid electrolyte layer, respectively, whereby an all-solid-state lithium ion secondary battery is obtained.

In this step, the electrochemical alloying reaction as represented by the formula (2) is initiated. That is, by passing electricity, the metal in the anode active material reacts with lithium ions to produce an alloy of the metal and Li.

The method for passing electricity through the battery member is not particularly limited. To efficiently promote the electrochemical alloying reaction as represented by the formula (2), current density may be in a range of from 0.1 to 6.0 $mA/cm^2$, or voltage may be in a range of from 4.3 to 4.7 V (vs $Li/Li^+$).

(3) Other Steps

As the other steps, examples include, but are not limited to, a step of forming the cathode mixture, a step of forming the solid electrolyte material part, and a step of forming the battery using the cathode mixture, the solid electrolyte material part and the anode mixture.

(The Step of Forming the Cathode Mixture)

In this step, the cathode mixture contains, for example, a Li-containing cathode active material. As needed, it contains other raw materials such as a binder, a solid electrolyte and an electroconductive material.

In the disclosed embodiments, the Li-containing cathode active material is not particularly limited, as long as it is an active material that contains a Li element. A substance can be used as the cathode active material without particular limitation, as long as it functions as the cathode active material in an electrochemical reaction in relation to the anode active material, and it promotes an electrochemical reaction that involves Li ion transfer. Also, a substance that is known as the cathode active material of a lithium ion battery, can be used in the disclosed embodiments.

The raw material for the cathode active material is not particularly limited, as long as it is a raw material that is applicable to the all-solid-state lithium ion secondary battery. As the raw material, examples include, but are not limited to, lithium cobaltate ($LiCoO_2$), lithium nickelate ($LiNiO_2$), lithium manganate ($LiMn_2O_4$), a different element-substituted Li—Mn spinel of the composition represented by $Li_{1+x}Ni_{1/3}Mn_{1/3}Co_{1/3}O_2$, $Li_{1+x}Mn_{2-x-y}M_yO_4$ (where M is one or more elements selected from Al, Mg, Co, Fe, Ni and Zn), lithium titanate ($Li_xTiO_y$) and lithium metal phosphate ($LiMPO_4$, M=Fe, Mn, Co, Ni, etc.)

The cathode active material may include a coating layer which has lithium ion conductivity and which contains a substance that is not fluidized even when it is in contact with the active material or solid electrolyte. As the substance, examples include, but are not limited to, $LiNbO_3$, $Li_4Ti_5O_{12}$ and $Li_3PO_4$.

The form of the cathode active material is not particularly limited. It may be a film form or particle form.

The percentage of the cathode active material in the cathode mixture is not particularly limited. For example, it may be 60 mass % or more, may be in a range of from 70 mass % to 95 mass %, or may be in a range of from 80 mass % to 90 mass %.

As the raw material for the solid electrolyte, the raw material for the electroconductive material and the raw material for the binder, the same materials as those used in the anode, can be used.

The raw material for the cathode mixture may further contain components that are removed in the process of forming the cathode mixture. As the components that are contained in the raw material for the cathode mixture and removed in the process of forming the cathode mixture, examples include, but are not limited to, the same components as the solvent that can be incorporated in the raw material for the anode mixture and the removable binder.

As the method for forming the cathode mixture, examples include, but are not limited to, the same method as the method for forming the anode mixture.

(The Step of Forming the Solid Electrolyte Material Part)

In the production method of the disclosed embodiments, the solid electrolyte material part contains a solid electrolyte raw material, for example. As needed, it contains other components.

As the solid electrolyte raw material, the same materials as those exemplified above under the section of the solid electrolyte in the above (1) can be used.

The percentage of the solid electrolyte raw material in the solid electrolyte material part is not particularly limited. For example, it may be 50 mass % or more, may be in a range of from 70 mass % to 99.99 mass %, or may be in a range of from 90 mass % to 99.9 mass %.

As the method for forming the solid electrolyte material part, examples include, but are not limited to, a method for compression-forming a powder of the solid electrolyte material containing the solid electrolyte raw material and, as needed, other components. In the case of compression-forming the powder of the solid electrolyte material, generally, as with the case of compression-forming the powder of the anode mixture, a press pressure of from about 400 to about 1,000 MPa is applied. The compression-forming may be carried out by using a roll press. In this case, a line pressure may be set to 10 to 100 kN/cm.

As a different method, a cast film forming method can be used, which uses a solution or dispersion of the solid electrolyte material that contains the solid electrolyte raw material and, as needed, other components.

(The Step of Forming the Battery Member)

In the production method of the disclosed embodiments, the battery member is an assembly of members having the following array structure, for example: the cathode mixture, the solid electrolyte material part and the anode mixture are arranged in this order; they may be directly attached or indirectly attached through a part composed of a different material; and a part composed of a different material may be attached to one or both of the opposite side of the cathode mixture to the position where the solid electrolyte material part is present (the outer side of the cathode mixture) and the opposite side of the anode mixture to the position where the solid electrolyte material part is present (the outer side of the anode mixture) (i.e., a cathode mixture-solid electrolyte material part-anode mixture assembly).

A part composed of a different material may be attached to the battery member, as long as Li ions can be passed in the direction from the cathode mixture side to the anode mixture side through the solid electrolyte material part. A coating layer such as $LiNbO_3$, $Li_4Ti_5O_{12}$ or $Li_3PO_4$ may be disposed between the cathode mixture and the solid electrolyte material part. A current collector, an outer casing, etc., may be attached to one or both of the outer side of the cathode mixture and the outer side of the anode mixture.

The battery member is typically an assembly having the following array structure: the cathode mixture, the anode mixture and the solid electrolyte material part disposed between the cathode mixture and the anode mixture are directly attached, and a part composed of a different material is not attached to both the outer side of the cathode mixture and the outer side of the anode mixture.

The method for producing the battery member is not particularly limited. For example, the battery member may be produced as follows: the powder of the raw material for the anode mixture is put in a compression cylinder for powder compression forming and deposited to a uniform thickness, thereby forming a layer of the powder of the raw material for the anode mixture; a powder of the raw material for the solid electrolyte, which contains the solid electrolyte powder and, as needed, other components, is placed on the layer of the powder of the raw material for the anode mixture and deposited to a uniform thickness, thereby forming a layer of the powder of the raw material for the solid electrolyte; a powder of the raw material for the cathode mixture, which contains the Li-containing cathode active material, is placed on the layer of the powder of the raw material for the solid electrolyte and deposited to a uniform thickness, thereby forming a layer of the powder of the raw material for the cathode mixture; and a powder deposit composed of the three powder deposited layers formed in this manner, is subjected to compression-forming at once, thereby producing the battery member.

The solid electrolyte material part, the anode mixture and the cathode mixture may be produced by a method other than the powder compression forming. Details of the method are as described above. For example, the solid electrolyte material part may be formed by the cast film forming method or a coating method with a die coater, using the solution or dispersion of the solid electrolyte material containing the solid electrolyte raw material. The anode mixture and the cathode mixture may be formed by the following method, for example: a method in which the dispersion containing the powder of the raw material for the anode mixture or cathode mixture and the removable binder, is applied on the solid electrolyte material part to form a coating film, and the coating film is heated to remove the binder from the coating film, or a method in which the powder containing the raw material for the anode mixture or cathode mixture and the removable binder, is subjected to compression forming to form the powder into the cathode mixture or anode mixture, and the thus-formed product is heated to remove the binder from the coating film. To increase electrode density, the anode mixture and the cathode mixture may be subjected to densification pressing in advance before the compression forming.

The anode mixture and the cathode mixture may be formed on a support other than the solid electrolyte material part. In this case, the anode mixture and the cathode mixture are removed from the support, and the removed anode mixture or cathode mixture is attached on the solid electrolyte material part.

The structure of the all-solid-state lithium ion secondary battery of the disclosed embodiments is not particularly limited, as long as the battery functions as a secondary battery. As shown in FIG. 1, typically, the all-solid-state lithium ion secondary battery of the disclosed embodiments comprises a cathode 2, an anode 3 and a solid electrolyte layer 1 disposed between the cathode 2 and the anode 3, which form a cathode-solid electrolyte layer-anode assembly 101. The cathode-solid electrolyte layer-anode assembly 101 is an assembly of members having the following array structure: the cathode, the solid electrolyte layer and the anode are arranged in this order; they may be directly attached or indirectly attached through a part composed of a different material; and a part composed of a different material may be attached to one or both of the opposite side of the cathode to the position where the solid electrolyte layer is present (the outer side of the cathode) and the opposite side of the anode to the position where the solid electrolyte layer is present (the outer side of the anode).

By attaching other members such as a current collector to the cathode-solid electrolyte layer-anode assembly 101, a cell, which is a functional unit of an all-solid-state battery, is obtained. The cell can be used as it is as an all-solid-state lithium ion battery, or a plurality of the cells can be electrically connected to form a cell assembly and used as the all-solid-state lithium ion battery of the disclosed embodiments.

For the cathode-solid electrolyte layer-anode assembly, generally, the thicknesses of the cathode and the anode are in a range of from about 0.1 μm to about 10 mm, and the thickness of the solid electrolyte layer is in a range of from about 0.01 μm to about 1 mm.

An example of the method for calculating the discharge capacity retention rate of the all-solid-state lithium ion secondary battery according to the disclosed embodiments, will be described below.

First, the battery is charged with constant current-constant voltage until a predetermined voltage is reached. Next, the charged battery is discharged with constant current-constant voltage. The charging and discharging are determined as one cycle, and X cycles are repeated.

The discharge capacity retention rate after X cycles is calculated by the following formula (5):

$$r=(C_X/C_{1st}\times 100 \qquad \text{Formula (5)}$$

In the formula (5), r is the discharge capacity retention rate (%) after X cycles; $C_X$ is the discharge capacity (mAh) at the X-th cycle; and $C_{1st}$ is the discharge capacity (mAh) at the first cycle. The value of X is not particularly limited; however, since the initial discharge capacity retention rate is easily influenced by uneven distribution of the electroconductive material in the anode, X may be 10 or less, or it may be 5.

EXAMPLES

Hereinafter, the disclosed embodiments will be further clarified by the following examples. The disclosed embodiments are not limited to the following examples, however.

1. PRODUCTION OF ALL-SOLID-STATE LITHIUM ION SECONDARY BATTERY

Example 1

(1) The Step of Forming Solid Electrolyte Particles for Anode

The following materials were put in a $ZrO_2$ pod (45 mL).

Sulfide-based solid electrolyte (15LiBr-10LiI -75 $(75Li_2S-25P_2S_5)$): 2 g

Dehydrated heptane: 5 g

Di-n-butyl ether: 3

$ZrO_2$ balls (diameter 0.3 mm): 40 g g

The inside of the $ZrO_2$ pod containing these materials, was filled with an argon atmosphere. Then, the pod was hermetically closed, absolutely. The $ZrO_2$ pod was installed in a planetary ball mill (product name: P7, manufactured by: FRITSCH) and subjected to wet mechanical milling for 20 hours at a plate rotational frequency of 200 rpm, thereby pulverizing the sulfide-based solid electrolyte. Then, a mixture thus obtained was heated at 210° C. for 3 hours on a hot plate, thereby obtaining solid electrolyte particles for an anode.

The BET specific surface area of the solid electrolyte particles for the anode was measured by a high-speed specific surface area measuring machine (product name: NOVA 4200e, manufactured by: Quantachrome Instruments Japan G.K.) and found to be 6.6 ($m^2/g$).

The average particle diameter of the solid electrolyte particles for the anode was measured by a dynamic light scattering (DLS) type particle size distribution measuring machine (product name: Nanotrac Wave-Q, manufactured by: MicrotracBEL Corp.) and found to be 1.0 μm.

(2) The Step of Forming Anode Mixture

The following raw materials for an anode were put in a container.

Anode active material: Si particles (average particle diameter: 5 μm)

Sulfide-based solid electrolyte: The above-mentioned solid electrolyte particles for the anode Electroconductive material: VGCF Binder: 5 Mass % butyl butyrate solution of a PVdF-based binder The content of the electroconductive material in the mixture of the above-mentioned raw materials for the anode, was controlled so that the volume percentage of the electroconductive material is 2.5 volume % when the total volume of an anode mixture thus obtained is determined as 100%.

The mixture in the container was stirred for 30 seconds by an ultrasonic disperser. Next, the container was shaken for 3 minutes by a shaker, thereby preparing a raw material for an anode mixture.

The raw material for the anode mixture was applied on one surface of a copper foil (an anode current collector) by a blade method using an applicator. The applied raw material for the anode mixture was dried on the hot plate at 100° C. for 30 minutes, thereby forming an anode mixture.

(3) The Step of Forming Cathode Mixture

The following raw materials for a cathode were put in a container.

Cathode active material: $LiNi_{1/3}Co_{1/3}Mn_{1/3}O_2$ particles (average particle diameter: 4 μm)

Sulfide-based solid electrolyte: $Li_2S—P_2S_5$-based glass ceramics particles containing LiBr and LiI (average particle diameter: 0.8 μm)

Electroconductive material: VGCF

Binder: 5 Mass % butyl butyrate solution of a PVdF-based binder

The mixture in the container was stirred for 30 seconds by the ultrasonic disperser. Next, the container was shaken for 3 minutes by the shaker. The mixture in the container was further stirred for 30 seconds by the ultrasonic disperser, thereby preparing a raw material for a cathode mixture.

The raw material for the cathode mixture was applied on one surface of an aluminum foil (a cathode current collector) by the blade method using the applicator. The applied raw material for the cathode mixture was dried on the hot plate at 100° C. for 30 minutes, thereby forming a cathode mixture.

(4) The Step of Producing Battery Member

The following raw materials for a solid electrolyte were put in a container.

Sulfide-based solid electrolyte: $Li_2S—P_2S_5$-based glass particles containing LiBr and LiI (average particle diameter: 2.5 μm)

Binder: 5 Mass % heptane solution of a BR-based binder

The mixture in the container was stirred for 30 seconds by the ultrasonic disperser. Next, the container was shaken for 3 minutes by the shaker. A solid electrolyte material part thus obtained was applied to an aluminum foil by a die coater and dried on the hot plate at 100° C. for 30 minutes (a solid electrolyte layer). A total of three solid electrolyte layers were produced.

A stack of the cathode mixture and the cathode current collector was pressed in advance, thereby obtaining a laminate. The solid electrolyte material part was applied on the cathode mixture-side surface of the laminate by the die coater and dried on the hot plate at 100° C. for 30 minutes, thereby obtaining a cathode side laminate I (solid electrolyte material part/cathode mixture/cathode current collector).

In the same manner, a stack of the anode mixture and the anode current collector was subjected to advance pressing, and the solid electrolyte material part was applied and dried, thereby obtaining an anode side laminate I (solid electrolyte material part/anode mixture/anode current collector).

To the solid electrolyte material part side of the cathode side laminate I, the solid electrolyte layer on the aluminum foil was further attached. While being in this state, they were subjected to densification pressing under the following condition. By the densification pressing, the solid electrolyte layer on the aluminum foil was integrated with the solid electrolyte material part of the cathode side laminate I.

Pressure: 5 kN/cm

Roll gap: 100 μm

Feed rate: 0.5 m/min

Then, the aluminum foil on the solid electrolyte layer side was peeled off, thereby obtaining a cathode side laminate II (solid electrolyte material part/cathode mixture/cathode current collector).

To the solid electrolyte material part side of the anode side laminate I, the solid electrolyte layer on the aluminum foil was further attached. While being in this state, they were subjected to densification pressing under the following condition. By the densification pressing, the solid electrolyte layer on the aluminum foil was integrated with the solid electrolyte material part of the anode side laminate I.

Pressure: 5 kN/cm

Roll gap: 100 μm

Feed rate: 0.5 m/min

Then, the aluminum foil on the solid electrolyte layer side was peeled off, thereby obtaining an anode side laminate II (solid electrolyte material part/anode mixture/anode current collector).

The cathode side laminate II subjected to the densification pressing, was punched into a disk by a jig (diameter: 11.28 mm). The anode side laminate II subjected to the densification pressing, was punched into a disk by a jig (diameter: 11.74 mm).

To the solid electrolyte material part side of the anode side laminate II, the solid electrolyte layer on the aluminum foil was further transferred. Then, the aluminum foil was peeled off, thereby obtaining an anode side laminate III (solid electrolyte material part/anode mixture/anode current collector).

The cathode side laminate II and the anode side laminate III were stacked so that their surfaces on each of which the solid electrolyte material part was formed, were in contact with each other. Also, the cathode side laminate II was arranged at the approximate center of the anode side laminate III. They were subjected to hot pressing under the following condition, thereby obtaining a battery member.

Pressure: 200 MPa

Temperature: 130° C.

Pressing time: 1 minute (5) The Step of Passing Electricity

Electricity was passed through the thus-obtained battery member with constant voltage and constant current at a 3-hour rate (⅓ C) until a predetermined voltage was reached (cutoff current 1/100 C). Therefore, the all-solid-state lithium ion secondary battery of Example 1 was obtained.

Example 2

The all-solid-state lithium ion secondary battery of Example 2 was produced in the same manner as Example 1, except that "(1) The step of forming solid electrolyte particles for anode" was changed to the following process.

The following materials were put in a $ZrO_2$ pod (45 mL).

Sulfide-based solid electrolyte (15LiBr-10LiI -75 ($75Li_2S$-$25P_2S_5$)): 2 g

Dehydrated heptane: 7 g

Di-n-butyl ether: 1 g $ZrO_2$ balls (diameter 1 mm): 40 g

The inside of the $ZrO_2$ pod containing these materials, was filled with an argon atmosphere. Then, the pod was hermetically closed, absolutely. The $ZrO_2$ pod was installed in the planetary ball mill (product name: P7, manufactured by: FRITSCH) and subjected to wet mechanical milling for 5 hours at a plate rotational frequency of 200 rpm, thereby pulverizing the sulfide-based solid electrolyte. Then, a mixture thus obtained was heated at 210° C. for 3 hours on the hot plate, thereby obtaining solid electrolyte particles for an anode.

The BET specific surface area and average particle diameter of the solid electrolyte particles for the anode were measured by the same methods as Example 1 and found to be 1.8 $m^2/g$ and 3.3 μm, respectively.

Example 3

The all-solid-state lithium ion secondary battery of Example 3 was produced in the same manner as Example 1, except that "(1) The step of forming solid electrolyte particles for anode" was changed to the following process.

The following materials were put in the slurry tank of a bead mill (product name: LMZ4, manufactured by: Ashizawa Finetech Ltd.)

Sulfide-based solid electrolyte (15LiBr-10LiI -75($75Li_2S$-$25P_2S_5$)): 800 g

Dehydrated heptane: 5 kg

Di-n-butyl ether: 1.5 kg $ZrO_2$ balls (diameter 0.3 mm): 13 kg

The slurry tank containing the above materials was subjected to wet mechanical milling for 10 minutes at a peripheral speed of 12 m/s, thereby pulverizing the sulfide-based solid electrolyte. Then, a mixture thus obtained was heated at 210° C. for 3 hours on the hot plate, thereby obtaining solid electrolyte particles for an anode.

The BET specific surface area and average particle diameter of the solid electrolyte particles for the anode were measured by the same methods as Example 1 and found to be 5.7 $m^2/g$ and 2.0 μm, respectively.

Example 4

The all-solid-state lithium ion secondary battery of Example 4 was produced in the same manner as Example 1, except that "(1) The step of forming solid electrolyte particles for anode" was changed to the following process.

The following materials were put in the slurry tank of the bead mill (product name: LMZ4, manufactured by: Ashizawa Finetech Ltd.)

Sulfide-based solid electrolyte (15LiBr-10LiI -75($75Li_2S$-$25P_2S_5$)): 800 g

Dehydrated heptane: 5 kg

Di-n-butyl ether: 1.5 kg $ZrO_2$ balls (diameter 0.3 mm): 13 kg

The slurry tank containing the above materials was subjected to wet mechanical milling for 4 hours at a peripheral speed of 12 m/s, thereby pulverizing the sulfide-based solid electrolyte. Then, a mixture thus obtained was heated at 210° C. for 3 hours on the hot plate, thereby obtaining solid electrolyte particles for an anode.

The BET specific surface area and average particle diameter of the solid electrolyte particles for the anode were measured by the same methods as Example 1 and found to be 13.4 $m^2/g$ and 1.6 μm, respectively.

Comparative Example 1

The all-solid-state lithium ion secondary battery of Comparative Example 1 was produced in the same manner as Example 1, except that "(1) The step of forming solid electrolyte particles for anode" was changed to the following process.

The following materials were put in the slurry tank of a bead mill (product name: LMZ015, manufactured by: Ashizawa Finetech Ltd.)

Sulfide-based solid electrolyte (15LiBr-10LiI -75 ($75Li_2S$-$25P_2S_5$)): 30 g

Dehydrated heptane: 200 g

Di-n-butyl ether: 80 g $ZrO_2$ balls (diameter 0.3 mm): 450 g

The slurry tank containing the above materials was subjected to wet mechanical milling for 4 hours at a peripheral speed of 16 m/s, thereby pulverizing the sulfide-based solid electrolyte. Then, a mixture thus obtained was heated at 210° C. for 3 hours on the hot plate, thereby obtaining solid electrolyte particles for an anode.

The BET specific surface area and average particle diameter of the solid electrolyte particles for the anode were measured by the same methods as Example 1 and found to be 28.4 $m^2/g$ and 1.0 μm, respectively.

2. MEASUREMENT OF VOIDAGE OF ANODE MIXTURE

For each of the anode mixtures after being dried in the anode mixture forming step in Examples 1 to 4 and Comparative Example 1, the voidage was measured.

First, the thickness of the anode mixture was measured by a micro-meter, and the volume was calculated. From the volume and mass of the anode mixture, the absolute density $D_1$ of the anode mixture was obtained. From the true density and content percentage of the substances contained in the anode mixture, the true density $D_0$ of the anode mixture was obtained. The true density of the substances in the anode mixture are as follows.

Si particles: 2.33 g/cm$^3$

Solid electrolyte particles for anode: 2.21 g/cm$^3$

VGCF: 2.0 g/cm$^3$

PVdF-based binder: 1.82 g/cm$^3$

The voidage V of the inside of the anode mixture was obtained by the following formula (1):

$$V=100-(D_1/D_0)\times 100 \quad \text{Formula (1)}$$

(where V is the voidage (%) of the inside of the dried anode mixture; $D_1$ is an absolute density (g/cm$^3$) of the anode mixture; and $D_0$ is a true density (g/cm$^3$) of the anode mixture.)

3. DISCHARGE TEST

For battery performance evaluation, the five all-solid-state lithium ion secondary batteries underwent a discharge test by the following method.

First, each battery was charged with constant current-constant voltage at a 3-hour rate (⅓ C) until a predetermined voltage was reached. At this time, a cutoff current was set to 1/100 C. Next, the charged battery was discharged with constant current-constant voltage.

The charging and discharging were determined as one cycle, and 5 cycles were repeated.

The discharge capacity retention rate after 5 cycles was calculated by the following formula (5a):

$$r=(C_5/C_{1st})\times 100 \quad \text{Formula (5a)}$$

In the formula (5a), r is the discharge capacity retention rate (%) after 5 cycles; $C_5$ is the discharge capacity (mAh) at the 5th cycle; and $C_{1st}$ is the discharge capacity (mAh) at the first cycle.

The discharge capacity retention rate after 5 cycles of each of Examples 1 to 4 when the discharge capacity retention rate after 5 cycles of Comparative Example 1 is determined as 100%, was calculated and determined as the specific capacity retention rate after 5 cycles of each of Examples 1 to 4.

The following Table 1 shows the specific capacity retention rates after 5 cycles of Examples 1 to 4 and Comparative Example 1, for comparison, along with the properties of the solid electrolyte particles for the anode and the properties of the dried anode mixture. The properties of the anode mixture include the density (the value obtained by dividing the absolute density $D_1$ by the true density $D_0$) of the anode mixture.

TABLE 1

| | Solid electrolyte particles for anode | | Dried anode mixture | | Specific capacity retention |
|---|---|---|---|---|---|
| | BET specific surface area (m$^2$/g) | Average particle diameter (μm) | Density ($D_1/D_0$) (%) | Voidage V (%) | rate (%) after 5 cycles |
| Example 1 | 6.6 | 1.0 | 57 | 43 | 109 |
| Example 2 | 1.8 | 3.3 | 48 | 52 | 109 |
| Example 3 | 5.7 | 2.0 | 47 | 53 | 109 |
| Example 4 | 13.4 | 1.6 | 46 | 54 | 109 |
| Comparative Example 1 | 28.4 | 1.0 | 40 | 60 | 100 |

4. CONCLUSION

As a result of comparing the specific capacity retention rates after 5 cycles shown in Table 1, Examples 1 to 4 are about 1.1 times higher than Comparative Example 1. This is because, while the voidage V in Comparative Example 1 is as high as 60%, the voidages V's in Examples 1 to 4 remain in a range of from 43% to 54%.

Therefore, it was proved that by using such an anode mixture that the voidage V of the anode mixture after being dried in the anode mixture forming step is in a range of from 43% to 54%, the resulting battery can inhibit a decrease in capacity and is excellent in cycle characteristics compared to the case of using an anode mixture out of the range.

REFERENCE SIGNS LIST

1. Solid electrolyte layer
2. Cathode
3. Anode
101. Cathode-solid electrolyte layer-anode assembly

The invention claimed is:

1. A method for producing an all-solid-state lithium ion secondary battery comprising a cathode, an anode and a solid electrolyte layer disposed therebetween, wherein the method comprises:

an anode mixture forming step of obtaining the anode mixture by drying a raw material for the anode mixture, which contains an anode active material, a solid electrolyte and an electroconductive material, and an electricity passing step of passing electricity through a laminate comprising a cathode mixture, the anode mixture and a solid electrolyte material part disposed between the cathode mixture and the anode mixture to change the cathode mixture, the anode mixture and the solid electrolyte material part into the cathode, the anode and the solid electrolyte layer, respectively;

wherein the anode active material comprises at least one active material selected from the group consisting of a metal that is able to form an alloy with Li and an oxide of the metal;

wherein, for the anode mixture after being dried in the anode mixture forming step, a voidage V of an inside of the anode mixture calculated by the following formula (1) is 52% or more and 54% or less:

$$V=100-(D_1/D_0)\times 100 \quad \text{Formula (1)}$$

wherein, in Formula (1), V is the voidage (%) of the inside of the dried anode mixture; $D_1$ is an absolute density (g/cm$^3$) of the anode mixture; and $D_0$ is a true density (g/cm$^3$) of the anode mixture; and wherein, a volume percentage of the electroconductive material is 2.5 volume % when a volume of the anode mixture after being dried in the anode mixture forming step is determined as 100 volume %.

2. The method for producing the all-solid-state lithium ion secondary battery according to claim 1, wherein the anode active material comprises silicon as the metal that is able to form the alloy with Li.

3. The method for producing the all-solid-state lithium ion secondary battery according to claim 1, wherein the solid electrolyte is a sulfide-based solid electrolyte.

4. The method for producing the all-solid-state lithium ion secondary battery according to claim 1, wherein the electroconductive material is at least one carbonaceous material selected from the group consisting of carbon black, carbon nanotube and carbon nanofiber.

* * * * *